Oct. 5, 1965

G. H. SHERER 3,210,578

MULTISPEED MOTOR CONNECTOR

Filed Jan. 12, 1962

WITNESSES
John C. Headley Jr.
James F. Young

INVENTOR
Glen H. Sherer
BY
ATTORNEY

Oct. 5, 1965  G. H. SHERER  3,210,578
MULTISPEED MOTOR CONNECTOR
Filed Jan. 12, 1962  2 Sheets-Sheet 2
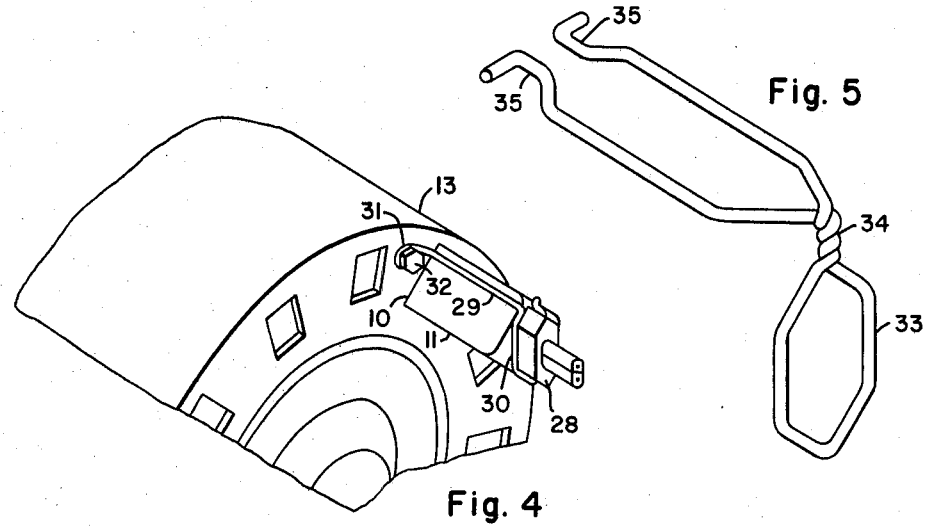
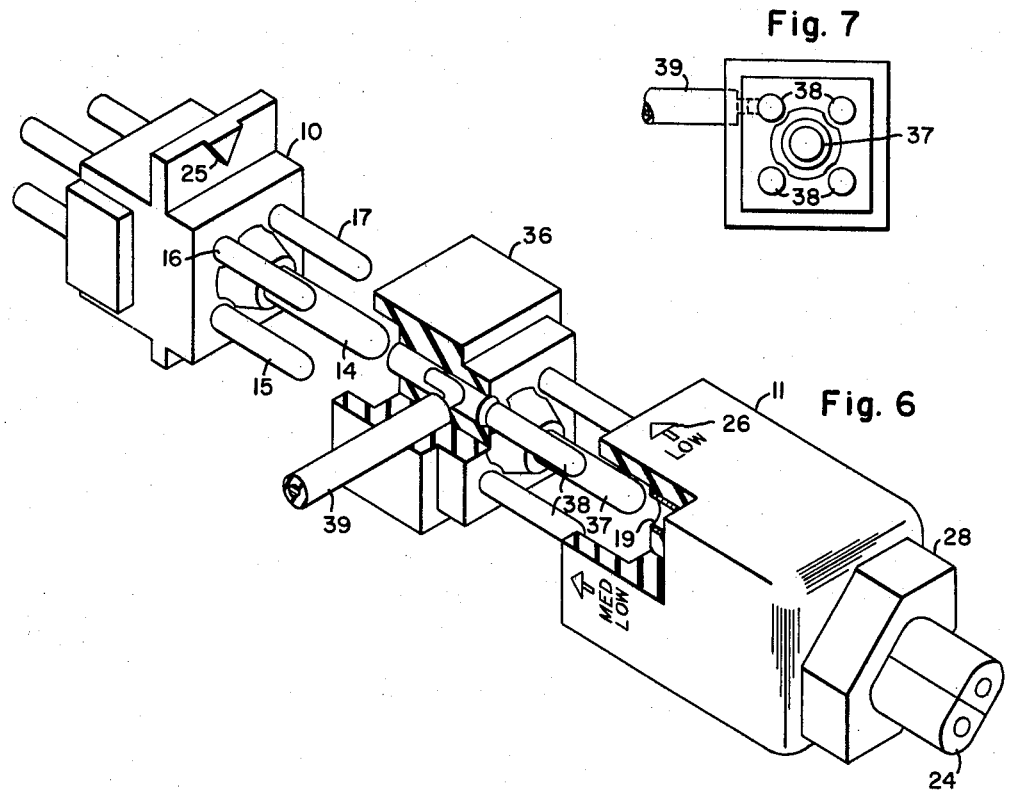

United States Patent Office 3,210,578
Patented Oct. 5, 1965

3,210,578
MULTISPEED MOTOR CONNECTOR
Glen H. Sherer, Lima, Ohio, assignor to Westinghouse Electric Corporation, East Pittsburgh, Pa., a corporation of Pennsylvania
Filed Jan. 12, 1962, Ser. No. 165,870
7 Claims. (Cl. 310—71)

The present invention relates to multispeed electric motors and, more particularly, to a connector for multispeed single-phase motors which permits the motor to be readily connected to a line for operation at any one of a plurality of speeds.

Multispeed single-phase motors are frequently used for purposes such as driving furnace blowers and, while the invention is not limited to any particular application, it is particularly suitable for use with furnace blower motors. In drives of this kind, the necessary speed of the blower is determined by the conditions of a particular installation, and multispeed motors are commonly used so that the motor can be connected for the desired speed at the time of installation. For this purpose, it has been customary heretofore to provide a number of relatively long leads extending from the motor, and the correct leads had to be selected at the time of installation for connection to the line. This arrangement obviously involves considerable difficulty in properly identifying the leads, and makes it easily possible to connect them erroneously with resultant operation at an incorrect speed and with a possibility of burning out the motor windings. Some type of connector at the motor itself which would make possible easy selection of the desired speed would be highly desirable, but these motors are frequently installed in relatively inaccessible locations and no satisfactory connector of this kind has heretofore been available.

The principal object of the present invention is to provide a multispeed single-phase motor which can easily be connected to a line for operation at a desired speed with little difficulty and with substantially no risk of error.

Another object of the invention is to provide a multispeed single-phase motor having a connector mounted on the motor itself for connecting the motor to a line and which permits easy selection of the desired speed of operation by properly positioning the connector.

Another object of the invention is to provide a separable connector for mounting directly on a multispeed motor, to connect the motor to a line, which permits selection of the desired operating speed in a very simple manner by properly positioning the parts of the connector with respect to each other, so that the desired speed is easily obtained with no risk of erroneous connection.

A still further object of the invention is to provide a separable connector for mounting on a multispeed motor which permits the motor to be readily connected to a line for operation at any one of a plurality of speeds, and which also makes it possible to obtain operation at either one of two preselected speeds without change or reconnection of the connector.

Other objects and advantages of the invention will be apparent from the following detailed description, taken in connection with the accompanying drawing, in which:

FIG. 4 is a fragmentary view of one of end of a motor showing the connecter in place and illustrating a retaining clamp or strain relief device;

FIG. 5 is a perspective view showing a modified form of retaining clamp;

FIG. 6 is a perspective view showing the parts of another embodiment of the separable connector separated from each other to show the arrangement; and FIG. 7 is a view in end elevation of an adapter member which forms part of the connector of FIG. 6.

Figure 1:
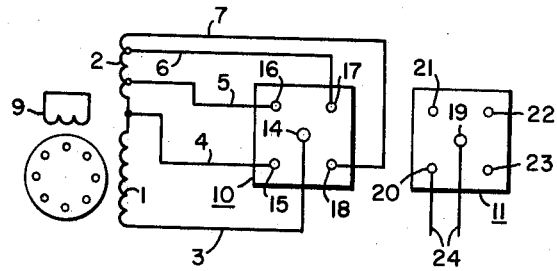
FIG. 1 is a schematic diagram of a multispeed single-phase motor with the new connector connected thereto.
Figure 2:
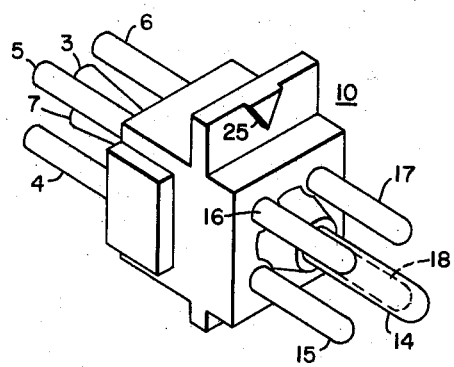
FIG. 2 is a perspective view showing the two parts of the separable connector separated from each other and partly broken away.
Figure 3:
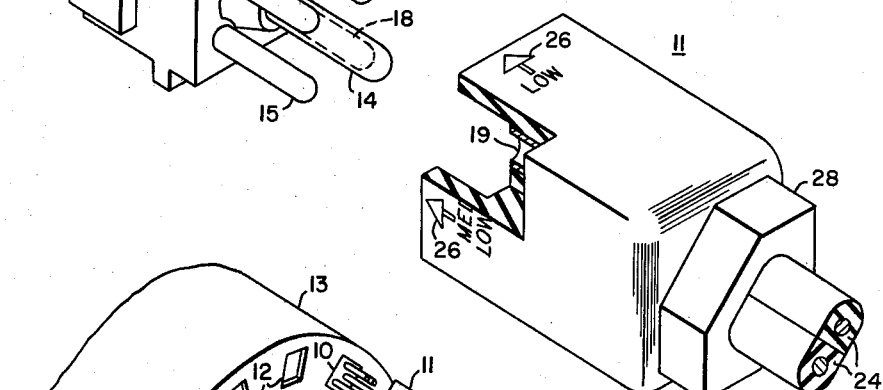
FIG. 3 is a perspective view of one end of a motor showing an illustrative manner of mounting the connector on the motor.

The invention is shown in an illustrative embodiment in FIGURES 1, 2 and 3 as applied to a multispeed single-phase motor of a known type. The motor is shown in FIG. 1 as having a main primary or stator winding 1 and a booster winding section 2 connected in series with the main winding. The motor shown is a four-speed motor and has a common terminal lead 3 connected to one end of the main winding 1. A high speed terminal lead 4 is connected to the other end of the main winding 1, and a medium high speed lead 5 and a medium low speed lead 6 are connected to taps in the booster winding 2. A low speed lead 7 is connected to the other end of the booster winding 2. The motor has a rotor 8 of any suitable type, shown as a squirrel-cage rotor, and is shown diagrammatically as a shaded pole motor as indicated by the short-circuited shading coil 9.

A motor of this type runs at its highest speed on the main winding section 1 alone, and when the booster winding 2 is added in series, the motor is weakened so that when driving a fan or similar load, it will run at a lower speed, any number of intermediate speeds being obtainable by suitable taps in the booster winding, to obtain a series of different torque characteristics to give different operating speeds. Motors of this type are well known, and the motor shown is to be taken as representing any type of multispeed single-phase motor having a common terminal lead and a plurality of other terminal leads alternatively connectible to a line for operation of the motor at different speeds.

As previously indicated, such multispeed motors are frequently used for such applications as furnace blower drives, where the necessary operating speed is determined by the conditions of a particular installation and the motor must be connected for the proper speed at the time of installation, the speed usually remaining unchanged thereafter. Heretofore, this has been done by bringing out all of the winding leads from the motor for external connection. This has made it necessary to select the correct two leads from a group of as many as four or five long leads for connection to the line to obtain the desired speed. This obviously involves considerable difficulty in identifying the correct leads and if the motor is connected erroneously, it will operate at an incorrect speed, or the winding may be burned out if two of the leads from the booster winding should be connected to the line to put full line voltage across part or all of the booster winding.

In accordance with the present invention, a connector device is provided for connecting the motor to the line which makes it very easy to select the correct speed and practically impossible to connect the motor erroneously. As shown in FIGURES 1 and 2, the new connector is a separable connector having two members 10 and 11. The member 10 may be made of any suitable insulating material, such as a molded plastic material, and is adapted to be mounted on the motor itself. Thus, as shown in FIGURE 3, the connector member 10 may be mounted directly in one of the ventilating openings 12 in the end bracket 13 of the motor and secured in place in any desired manner. It will be obvious, however, that the connector 10 may be mounted on the motor bracket or on the frame of the motor in any desired or convenient location.

The fixed connector member 10 has a central terminal element 14 which is connected to the common terminal lead 3 of the motor. The connector member 10 also has a plurality of outer terminal elements corresponding in number to the number of other terminal leads from the motor. In the four-speed motor illustrated, therefore, there are four outer terminals 15, 16, 17 and 18 connected to the leads 4, 5, 6 and 7, respectively, as shown in FIGURE 1. The outer terminal elements of the connector member 10 are arranged symmetrically about the center lines of the connector 10 and thus form the corners of a square in the illustrated embodiment. The body of the connector 10 is preferably of square shape, as shown, although it may of course be of any desired configuration to facilitate mounting on the motor.

The removable member 11 of the separable connector may also be molded from plastic material, or any desired insulating material, and has a central terminal element 19. The connector element 11 also has a second terminal element 20 and it is provided with recesses or openings 21, 22 and 23 which do not contain terminal elements or which contain terminal elements not connected to any external leads. The terminal element 20 and the openings 21, 22 and 23 correspond in position to the outer terminal elements 15, 16, 17 and 18 of the fixed connector member 10, and the central terminal element 19 corresponds in position to the central terminal element 14.

The terminal elements 19 and 20 of the removable connector member 11 are connected to the two conductors of a single-phase line 24, and it will be seen that when the two members of the connector are engaged, the central terminal element 14 engages the terminal element 19 so that the common lead 3 of the motor is connected to one side of the line, while the terminal element 20 will engage one of the terminal elements 15, 16, 17 or 18 so that one of the motor leads 4, 5, 6 or 7 is connected to the other side of the line to cause the motor to operate at the corresponding speed. Since the terminal elements of the fixed connector member 10 are symmetrically arranged about the central terminal element, and since the terminal elements or openings of the separable connector member 11 are correspondingly positioned, the separable member 11 may be engaged with the fixed member 10 in any one of four positions so that the terminal element 20 may be engaged with any one of the four outer terminal elements of the fixed connector member. Thus the speed at which the motor operates may be selected by properly positioning the separable element of the connector with respect to the fixed element in any one of the four possible positions corresponding to the four operating speeds.

To facilitate properly connecting the motor, an index mark which may be an arrow 25 is preferably molded in the stationary connector member 10 and may, if desired, be made of a contrasting color. Corresponding indicia for cooperation with the index mark 25 are provided on the separable member 11. Thus, on each side of the member 11 an arrow 26 may be molded in the connector with a designation of the speed for which the motor is connected when that arrow is aligned with the index mark 25 on the stationary connector member. Any other desired type of indicia or identifying markings may, of course, be used.

The connector members and terminal elements themselves may be of any suitable type or construction. For the four speed motor shown, the connectors are preferably square in cross section, with the terminal elements arranged at the corners of the square so as to be symmetrically disposed about the central terminal element. For other numbers of speeds a different arrangement may be preferable. The connector members, however, should preferably be of polygonal cross section with a number of sides corresponding to the number of motor speeds, and with the outer terminal elements of the fixed connector members symmetrically disposed with respect to a central terminal, so that the removable connector member can be engaged with the stationary member in any one of a number of positions corresponding to the number of speeds, as explained above.

The terminal elements themselves may be of any desired type. In the preferred embodiment shown in the drawing, male terminals are provided on the fixed connector member 10 and female terminals of corresponding shape and position are provided in the removable member 11, the terminal elements in the removable member preferably being recessed within the insulating body of the connector as shown to provide protection when an energized line is disconnected from the motor. Any desired type and arrangement of terminal elements might be used, however, which will permit the two parts of the connector to be engaged in the manner described.

In some cases where severe vibration may occur, or where for other reasons it may be desirable to positively retain the members of the connector in engagement to prevent accidental or unintentional disconnection, a retaining member or strain relief clamp may be provided as shown in FIG. 4. The removable member 11 of the connector is provided with an end portion 28 of smaller size than the body of the connector member, and preferably of polygonal cross section with a greater number of sides than the body of the connector member 11, the end portion 28 being shown as hexagonal in the illustrated embodiment. The retaining member 29 may be made of heavy wire, or similar material, and has an end loop portion 30 formed to the configuration of the end portion 28 of the connector member 11 so as to fit over the end portion and engage it snugly. The two ends of the loop 30 are bent at right angles and extend along the sides of the connector member 11, and have loops 31 at the other end adapted to be attached to the end bracket 13 of the motor by screws 32, or in any desired manner. In this way, the parts of the separable connector are positively retained in place to prevent accidental disconnection of the motor.

A modified form of retaining member is shown in FIGURE 5 which may be somewhat easier to apply in some cases. This member is also made of heavy wire, or similar material, and has a loop portion 33 formed to fit over the end portion 28 of the connector member 11 in the same manner as described above. The two ends of the loop are twisted together, as indicated at 34, with the ends of the wire extending along the sides of the connector member 11, as previously described, and terminating in hook portions 35. To apply this retaining member, the loop 33 is placed over the end portion 28 of the connector member and the two hook portions 35 are brought together by squeezing the two wires together so that the hooks can be inserted through a ventilating opening or other convenient opening in the motor bracket or frame and then released to engage the retaining member with the motor. Where such an opening is available adjacent the location of the connector, this type of retaining member can be very easily applied and removed.

FIGURE 6 shows an embodiment of the invention which may be used where operation at either one of two speeds is desired. Furnace blower motors are frequently used in connection with air conditioning equipment during warm weather, as well as for furnace operation during cold weather. In such cases, operation at the highest speed is usually required for air conditioning while for furnace operation, it may be necessary to operate the motor at a lower speed. In most cases, particularly in home furnaces, it is not desirable to reconnect the motor after it has once been installed because it may not be easily accessible and because the user of the motor cannot usually be expected to reconnect the motor whenever operation is changed from heating to air conditioning, or from air conditioning to heating. The modification of the invention shown in FIG. 6 is suitable for such cases.

In FIGURE 6, the stationary member 10 and the removable member 11 of the separable connector may be identical to those previously described. In this embodiment of the invention, there is also provided an adapter member 36 which is inserted between the members 10 and 11. The adapter member 36 may also be molded of plastic material and conforms in shape to both the connector members 10 and 11. The adapter member 36 has a central terminal element 37 and has outer terminal elements 38 corresponding in number and position to the outer terminal elements of the connector member 10. The terminal elements 37 and 38 of the adapter member 36 are adapted to engage the terminal elements of the fixed connector member 10 on one side, and the terminal elements of the removable connector member 11 on the other side.

When the adapter element is in position between the other two connector members and all three are engaged, the connection between the terminal elements of the connector member 10 and the terminal elements of the connector member 11 are made through the adapter and are exactly as previously described, and the operating speed of the motor is selected in the same way by properly positioning the connector member 11. An additional lead 39 is provided, however, which is molded in the adapter member 36 and which is connected to one of the outer terminal elements 38 of the adapter 36. When the adapter is in place and the central terminal element 19 of connector member 11 is connected to one side of the line, operation of the motor at a speed corresponding to the position of the connector member 11 is obtained by connecting the terminal element 20 to the other side of the line, as previously explained. Operation at a second speed, determined by the position of the adapter 36, is also obtainable by connecting the lead 39 to the line instead of the terminal 20.

Thus, with the adapter 36 in place, operation of the motor at either one of two preselected speeds is readily obtained by connecting either the lead 39 or the terminal element 20 to one side of the line, the terminal element 19 remaining permanently connected to the other side of the line. This change in connection can be made by an external switch or relay or by any desired means when it is desired to change from one speed of operation to the other.

It will now be apparent that a connector device for multispeed motors has been provided which has many advantages. No external leads from the motor are required, and the desired operating speed for the motor is readily selected by properly positioning the removable member of the connector with respect to the fixed member. This arrangement makes it impossible to erroneously connect the motor in a manner that will burn out the motor winding, since the common terminal lead of the motor is always connected to the central terminal elements of the connector members and it is impossible to get only a portion of the booster winding across the line. The motor is thus easily connected in the desired manner with minimum difficulty and with substantially no risk of erroneous connection. No connections external to the motor are required and the motor is connected to the line merely by engaging the two members of the connector in the proper relative position. The connector can easily be mounted in any desired or convenient position on the motor end bracket or on the frame, and the connector can readily be applied to motors of any usual construction.

Certain specific embodiments of the invention have been shown and described for the purpose of illustration, but it will be obvious that various modifications and other embodiments are possible within the scope of the invention. The invention is not restricted, therefore, to the specific details and structural arrangements shown but in its broadest aspects it includes all equivalent modifications and embodiments.

I claim as my invention:

1. In a multispeed electric motor having a common terminal lead for connection to a single-phase line and a plurality of other terminal leads for alternative individual connection to the line for operation of the motor at different speeds, means for connecting said motor to a line comprising a first connector member mounted on the motor, said first connector member having a central terminal element connected to said common terminal lead and having a plurality of outer terminal elements each connected to one of said plurality of other terminal leads, and a second connector member adapted to be engaged with the first connector member to be removably carried thereby, said second connector member having two terminal elements adapted to be connected to a single-phase line, one of the terminal elements of the second connector member being positioned to engage the central terminal element of the first connector member in any position of the second connector member and the other terminal element of the second connector member being positioned to be selectively engageable with any one of the outer terminal elements of the first connector member.

2. In a multispeed electric motor having a common terminal lead for connection to a single-phase line and a plurality of other terminal leads for alternative individual connection to the line for operation of the motor at different speeds, means for connecting said motor to a line comprising a first connector member mounted on the motor, said first connector member having a central terminal element connected to said common terminal lead and having a plurality of outer terminal elements each connected to one of said plurality of other terminal leads, said outer terminal elements being symmetrically disposed about the central terminal element, and a second connector member adapted to be engaged with the first connector member to be removably carried thereby, said second connector member having two terminal elements adapted to be connected to a single-phase line, the terminal elements of the second connector member corresponding in position to the central terminal element and an outer terminal element of the first connector member, whereby the terminal elements of the second connector member can be selectively engaged with the central terminal element and any one of the outer terminal elements of the first connector member to effect operation of the motor at a desired speed.

3. In a multispeed electric motor having a common terminal lead for connection to a single-phase line and a plurality of other terminal leads for alternative individual connection to the line for operation of the motor at different speeds, means for connecting said motor to a line comprising a first connector member mounted on the motor, said first connector member having a central terminal element connected to said common terminal lead and having a plurality of outer terminal elements each connected to one of said plurality of other terminal leads, said outer terminal elements being symmetrically disposed about the central terminal element, and a second connector member adapted to be engaged with the first connector member to be removably carried thereby, said second connector member having two terminal elements adapted to be connected to a single-phase line, the terminal elements of the second connector member corresponding in position to the central terminal element and an outer terminal element of the first connector member, whereby the terminal elements of the second connector member can be selectively engaged with the central terminal element and any one of the outer terminal elements of the first connector member to effect operation of the motor at a desired speed, the first connector member having an index mark thereon, and the second connector member having indicia thereon in positions to cooperate with said index mark to indicate the speed for which the motor is connected.

4. In a multispeed electric motor having a common terminal lead for connection to a single-phase line and a plurality of other terminal leads for alternative individual connection to the line for operation of the motor at different speeds, means for connecting said motor to a line comprising a first connector member mounted on the motor, said first connector member having a central terminal element connected to said common terminal lead and having a plurality of outer terminal elements each connected to one of said plurality of other terminal leads, said outer terminal elements being symmetrically disposed about the central terminal element, a second connector member adapted to be engaged with the first connector member to be removably carried thereby, said second connector member having two terminal elements adapted to be connected to a single-phase line, the terminal elements of the second connector member corresponding in position to the central terminal element and an outer terminal element of the first connector member, whereby the terminal elements of the second connector member can be selectively engaged with the central terminal element and any one of the outer terminal elements of the first connector member to effect operation of the motor at a desired speed, and removable retaining means engaging said second connector member and said motor for retaining the second connector member in place on the first connector member.

5. In a multispeed electric motor having a common terminal lead for connection to a single-phase line and a plurality of other terminal leads for alternative individual connection to the line for operation of the motor at different speeds, means for connecting said motor to a line comprising a first connector member mounted on the motor, said first connector member having a central terminal element connected to said common terminal lead and having a plurality of outer terminal elements each connected to one of said plurality of other terminal leads, said outer terminal elements being symmetrically disposed about the central terminal element, a second connector member adapted to be engaged with the first connector member to be removably carried thereby, said second connector member having two terminal elements adapted to be connected to a single-phase line, the terminal elements of the second connector member corresponding in position to the central terminal element and an outer terminal element of the first connector member, whereby the terminal elements of the second connector member can be selectively engaged with the central terminal element and any one of the outer terminal elements of the first connector member to effect operation of the motor at a desired speed, said second connector member having an end portion of reduced size, and a retaining member engaging said end portion of the second connector member and having means for attaching the retaining member to the motor to retain the second connector member in place on the first connector member.

6. In an electric motor having a common terminal lead for connection to a single-phase line and a plurality of other terminal leads for alternative connection to the line for operation of the motor at different speeds, means for connecting said motor to a line comprising a first connector member mounted on the motor, said first connector member having a central terminal element connected to said common terminal lead and having a plurality of outer terminal elements each connected to one of said plurality of other terminal leads, said outer terminal elements being symmetrically disposed about the central terminal element, a second connector member adapted to be engaged with the first connector member to be removably carried thereby, said second connector member having two terminal elements adapted to be connected to a single-phase line, the terminal elements of the second connector member corresponding in position to the central terminal element and an outer terminal element of the first connector member, whereby the terminal elements of the second connector member can be selectively engaged with the central terminal element and any one of the outer terminal elements of the first connector member to effect operation of the motor at a desired speed, and means interposed between the first and second connector members for effecting electrical connection to one of the outer terminal elements of the first connector member.

7. In an electric motor having a common terminal lead for connection to a single-phase line and a plurality of other terminal leads for alternative connection to the line for operation of the motor at different speeds, means for connecting said motor to a line comprising a first connector member mounted on the motor, said first connector member having a central terminal element connected to said common terminal lead and having a plurality of outer terminal elements each connected to one of said plurality of other terminal leads, said outer terminal elements being symmetrically disposed about the central terminal element, an adapter member having a central terminal and outer terminal elements corresponding in number and position to the terminal elements of the first connector member and adapted to be engaged therewith, an electrical lead connected to one of the outer terminal elements of the adapter member and extending therefrom, and a second connector member adapted to be engaged with the adapter member, said second connector member having two terminal elements adapted to be connected to a single-phase line, the terminal elements of the second connector member corresponding in position to the central terminal element and an outer terminal element of the adapter member, whereby the adapter member and the second connector member can be engaged with each other and with the first connector member in a plurality of alternative positions to permit operation of the motor at either of two preselected speeds.

References Cited by the Examiner
UNITED STATES PATENTS

| | | | |
|---|---|---|---|
| 2,634,344 | 4/53 | Robinson | 310—71 |
| 2,663,000 | 12/53 | Keith | 310—71 |
| 2,722,645 | 11/55 | Brown | 310—71 |
| 2,922,054 | 1/60 | Miller | 310—71 |
| 3,139,492 | 6/64 | Cage | 339—31 X |

FOREIGN PATENTS
849,872   9/52   Germany.

ORIS L. RADER, *Primary Examiner*
JOHN F. COUCH, *Examiner.*